Oct. 8, 1940.  F. PENNELL  2,217,453
HOIST
Filed Aug. 20, 1938   2 Sheets-Sheet 1

INVENTOR
FORD PENNELL
BY Rodney Bedell
ATTORNEY

Oct. 8, 1940.  F. PENNELL  2,217,453
HOIST
Filed Aug. 20, 1938  2 Sheets-Sheet 2

INVENTOR
FORD PENNELL
BY Rodney Bedell
ATTORNEY

Patented Oct. 8, 1940

2,217,453

UNITED STATES PATENT OFFICE 2,217,453

HOIST

Ford Pennell, Webster Groves, Mo.

Application August 20, 1938, Serial No. 225,887

7 Claims. (Cl. 254—170)

The invention relates to gearing devices particularly constructed and arranged for mechanical hoists and consists in all of the novel features illustrated in the accompanying drawings and described below.

It is customary in devices of the type referred to, which usually are hand operated, to utilize a worm and wheel gear to provide sufficient power for handling heavy loads carried by the hoists. Because of the low ratio between the driving and driven parts of such a gear, it is impossible to move the driven member rapidly as may be highly desirable in taking up slack or otherwise adjusting the device.

One object of the present invention is to provide a clutch between the driving and driven parts of the mechanism which will facilitate quick movement of the driven part when it is not loaded but which will securely hold the driven part against rapid movement when it is loaded thereby avoiding the danger of rapid movement under conditions which might create a hazard for the user. Frequently devices of this type are used carelessly and are exposed to moisture and all kinds of dirt, and it is another object of the invention to protect the mechanism from deterioration and to prevent loss and adulteration of lubricant applied to the mechanism.

These and other detailed objects of the invention which will appear from the following description are attained by the structure illustrated in the accompanying drawings, in which—

Figures 1, 2, 3:
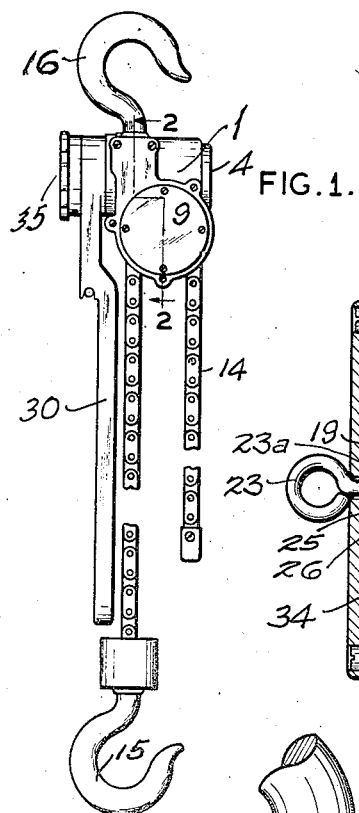
Figure 1 is an elevation of a preferred form of the invention.
Figure 2 is an enlarged vertical section taken on the line 2—2 of Figure 1.
Figure 3 is a view and section taken on the line 3—3 of Figure 2.
Figure 4:
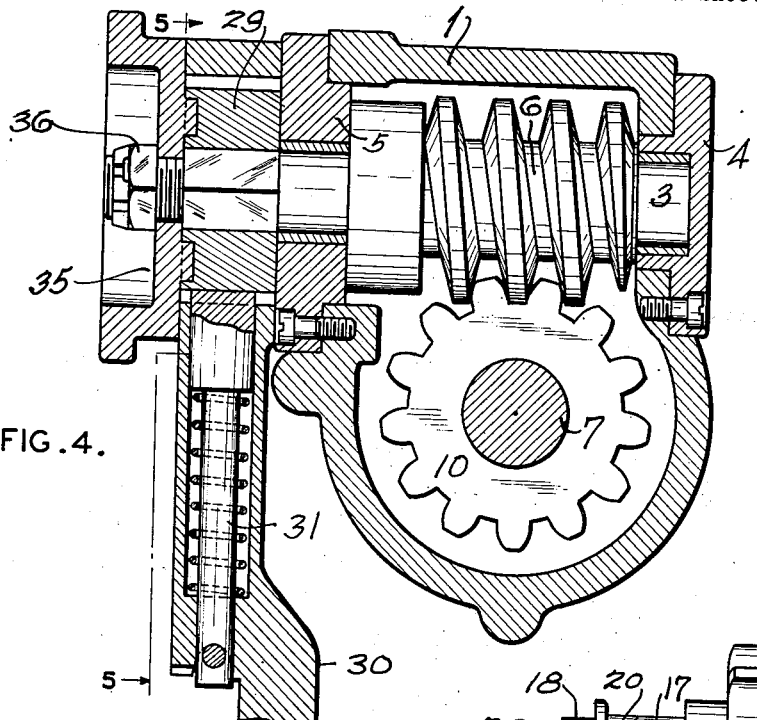
Figure 4 is a vertical section taken on the line 4—4 of Figure 2.

The device includes a casing or housing comprising two parts 1 and 2. Part 1 opens laterally to receive a driving shaft 3 journaled in caps 4 and 5 and mounting a worm 6. A driven shaft 7 extends through part 1 transversely of the plane of the axis of shaft 3 and is journaled in a vertical web 8 on part 1 and in a removable cap 9 secured to the part. Shaft 7 includes or fixedly mounts a worm gear 10 enmeshed with worm 6.

A sprocket wheel 11 is rotatably mounted on shaft 7 and includes a hub 12 journaled in a vertical web 13 in part 2 and providing another bearing for shaft 7. A chain 14 overlies sprocket wheel 11 and terminates in a hook 15 upon which the load may be carried. A hook 16 is swivel mounted in the upper end of the casing for suspending the device from a suitable support. Wheel 11, chain 14, and hooks 15 and 16 are in vertical alignment and the wheel is supported by a bearing on each side of a vertical line passing through the center of the wheel and the hooks and chain whereby the entire device is in equilibrium.

Sprocket wheel 11 is operatively connected to shaft 7 by a clutch including a series of teeth 17 on the outer face of the wheel hub 12, and a ratchet member 18 slidable on shaft 7 but non-rotatably mounted thereon by a spline-like key 19. Member 18 has teeth 20 opposing teeth 17 on the sprocket wheel. One side of each tooth is undercut, as indicated at 21, and the angle of this undercut is such that when there is a substantial load on chain 14, member 18 will be held against movement longitudinally of shaft 7 to disengage the teeth. The other side of each tooth is inclined, as indicated at 22, and the angle of this inclination is such that when chain 14 is relieved of its load, wheel 11 and the chain may be rotated freely on shaft 7, by overrunning the ratchet, to take up slack in the chain.

The recessed outer face of member 2 and the corresponding cup-like cap 34 provide a chamber for the clutch structure and this chamber is substantially closed to exclude dirt, etc.

A disc spring 27 has its peripheral portion gripped between member 2 and cap 34 and has its inner apertured periphery distorted so that it presses on a peripheral rib 28 on ratchet member 18 to thrust the same to the right to normally maintain engagement of clutch teeth 17 and 20.

When the device is not under load, it is desired that the clutch structure be releasable to permit independent movement of the sprocket wheel and shaft in either direction. The device for releasing the clutch parts includes a finger pull piece 23 with a head 24 on its inner end and received in a longitudinal bore in shaft 7. A spring 25 is seated at one end on head 24 and at its other end bears against a plate 26 extending across the end of shaft 7 and secured to ratchet member 18.

A transverse pin 23a extending through pin 23 forms a shoulder on the pin arranged to engage the inner wall of cap 24 to limit the outward movement of piece 23. If there is no load on the sprocket wheel and its chain, an outward pull on piece 23 will move ratchet part 18 away from ratchet part 12 and disengage teeth 17 and 20 from each other to permit the sprocket wheel to be rotated freely in either direction on shaft 7. If there is a substantial load on the ratchet wheel and its chain, the thrust between the undercut teeth, plus the inward thrust of spring 27, will be greater than the thrust in the opposite direction by spring 25, when piece 23 is retracted, and the clutch will not be disengaged by a pull on piece 23. Such a pull will compress spring 25 until pin 23a strikes cap 34 but will not shift ratchet member 18. The stop 23a comprises a safety feature rendering it impossible to withdraw piece 23 far enough to build up excessive thrust in spring 25, or to make the coil solid, and thereby overcome the automatic clutch engagement maintaining function of spring 27 and the undercut teeth.

If there is no load on hook 15, element 23 may be actuated to release the clutch, and chain 14 quickly drawn, in either direction, to its maximum length, or as much thereof as may be necessary, to bring hook 15 adjacent to the work. Element 23 is then released, hook 15 applied to the work, and any slack in the chain readily taken up by pulling on the end opposite the hook, the ratchet teeth over-running each other to facilitate such adjustment. The hoist is then actuated in the usual manner by oscillation of handle 30 and, as soon as the load is applied to the chain, the combination of the thrust by spring 25 and by the inclined interengaging faces of teeth 17 and 20 will lock the clutch against any accidental disengagement.

The outer end of driving shaft 3 has fixed thereon a toothed wheel 29 carrying an operating arm 30 having a spring pressed plunger 31 engaging the wheel teeth when the arm is moved in one direction, and slidable over the wheel teeth when the arm is moved in the other direction. Plunger 31 may be rotated in arm 30 by pin 31a so that the plunger tooth faces in the opposite direction. Hence wheel 29 and shaft 3 may be selectively rotated in either direction by oscillation of arm 30. Wheel 29 and the adjacent portion of the operating arm are provided with a cover 35 secured to the end of shaft 3 by a nut 36.

The webs of casing part 1, together with caps 4, 5, and 9, form a closed chamber for the worm wheel gear, and a packing 32 surrounding shaft 7 where it passes through web 8 cooperates to prevent the loss of lubricant and the entrance of dirt to this chamber which should contain relatively thin lubricant to facilitate the operation of the gear. The opposing portions of members 1 and 2 form a compartment for the sprocket wheel which is substantially closed but is provided with openings 33 for the chain.

Figure 6:
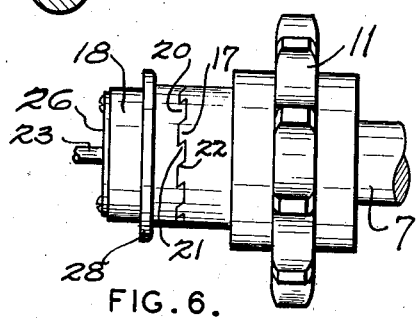
Figure 6 is an elevation of the clutch structure sectioned in Figure 2.
Figure 5:
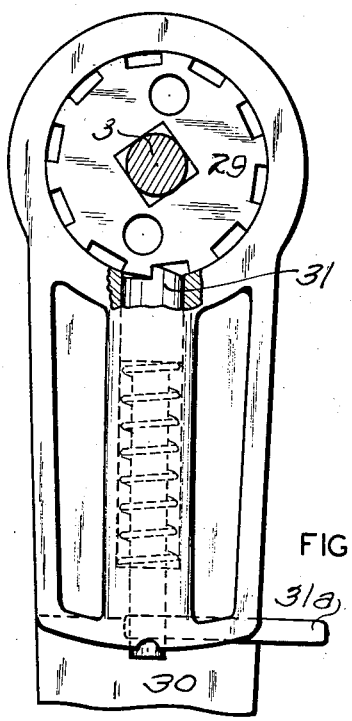
Figure 5 is a side view of the operating handle and ratchet.
Figure 7:
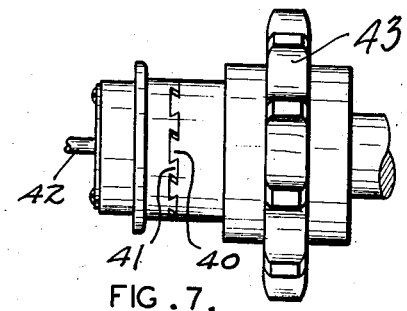
Figure 7 is a similar elevation showing a modified clutch structure.

Figure 7 illustrates a modification of the clutch structure in which the opposing teeth 40 and 41 are undercut on both faces, thereby eliminating the automatic over-running feature characteristic of the clutch illustrated in Figure 6. This arrangement may tend to slow the slack adjusting operation slightly because it will be necessary to separate the clutch members manually by pulling on element 42 (corresponding to element 23) before the sprocket wheel 43, and its chain, may be moved independently of the shafts which are interconnected by the worm and wheel gearing. However, the arrangement possesses the advantage that a lifting hook may be carried on each end of the chain and when, for example, the device has been operated to raise a weight or to tighten a cable and the load supporting portion of the chain has been shortened until one hook is adjacent to the housing, then the other hook, on the long portion of the chain, may be attached to the load and the pawl 31 of the operating handle reversed so that oscillation of the operating handle reverses the direction of rotation of worm 6, wheel 10, and sprocket 11 to exert pull on the long portion of the chain. This step by step operation may be repeated as often as required without first securing the load at a given point and then releasing the sprocket wheel and retracting the chain to obtain a fresh grip by the single hook as would be required with the over-running clutch construction first described.

The details of the construction may be changed substantially from the forms as shown in the drawings in various ways without departing from the spirit of the invention and the exclusive use of such modifications as come within the scope of the claims is contemplated.

What is claimed is:

1. In a device of the class described, a housing, a shaft journaled in and substantially inclosed by said housing, a load supporting member rotatably mounted upon said shaft, a clutch between said shaft and member including a part rigid with said member and a part slidably but non-rotatably mounted on said shaft, said parts having opposing teeth facing longitudinally of said shaft, a spring in said housing thrusting said shaft mounted part towards said first-mentioned part, and a manually operable element connected to said shaft mounted part and extending through a restricted opening in said housing and adapted to be moved manually to overcome the thrust of said spring to disengage said teeth when they are not under load and thereby render said member movable independently of said shaft.

2. A device as described in claim 1 in which the interengaging teeth on the clutch parts are undercut at such an angle that when a substantial load is carried by the load-supporting member the teeth cannot be separated by manual pull on the tooth disengaging element.

3. In a device of the class described, a driven shaft, a sprocket wheel rotatably mounted thereon, a load-supporting chain on said sprocket wheel, a clutch between said shaft and sprocket wheel and comprising a part slidably but non-rotatably mounted on said shaft, said part and sprocket wheel having opposing teeth, a spring thrusting said part and sprocket wheel towards each other to enmesh said teeth, said shaft having a recess in one end, a plate covering said recess and secured to said part, a spring received in said recess and seated against said plate, a pull rod extending through said plate into said recess and engaging the end of said spring at the inner end of said recess, said pull rod spring compressing when pull is exerted on said pull rod while said chain is loaded, because the resulting friction between the clutch teeth and the thrust of said clutch engaging spring exceeds the resistance of said pull rod spring, said pull rod spring resisting substantial compression when said chain is substantially free of load, and transmitting the pull on the rod to said clutch part to overcome said clutch spring and separate said clutch teeth and thereby accommodate relative movement of said sprocket wheel and shaft.

4. In a device of the class described, a driven shaft, a sprocket wheel rotatably mounted thereon, a load-supporting chain on said sprocket wheel, a clutch between said shaft and sprocket wheel and comprising a part slidably but non-rotatably mounted on said shaft, said part and sprocket wheel having opposing teeth, a spring thrusting said part and sprocket wheel towards each other to enmesh said teeth, said shaft having a recess in one end, a plate covering said recess and secured to said part, a spring received in said recess and seated against said plate, a pull rod extending through said plate into said recess and engaging the end of said spring at the inner end of said recess, whereby yielding thrust may be applied to said part to move it away from said sprocket wheel to disengage said teeth and provide for relative movement of said sprocket wheel and shaft, and stop structure limiting the movement of said pull rod and the thrust it may exert on said part whereby said teeth will remain engaged when under load.

5. In a device of the class described, a housing, a shaft member journalled in and substantially enclosed by said housing, a member rotatably mounted upon said shaft member, one of said members being a driving member and the other of said members being a driven member and adapted to carry a load supporting chain or the like, a clutch between said members including a part rigid with one of said members and a part slidably but non-rotatably mounted on the other of said members, said parts having opposing teeth facing longitudinally of said shaft member, a spring thrusting said slidably mounted part towards the other of said parts to engage said teeth, and a structure connected to said slidably mounted part and extending through a restricted opening in said housing and adapted to be actuated manually to overcome the thrust of said spring and to move the slidably mounted part to disengage said teeth when they are not under load and thereby render said members rotatable independently of each other.

6. A device as described in claim 5 in which the interengaging teeth on the clutch parts are undercut at such an angle that when a substantial load is carried by the load-supporting member the teeth cannot be separated by manual pull on the tooth disengaging structure.

7. In a device of the class described, a driving member, a driven member, a clutch between said members including parts individual to and rotatable with said members and having cooperating undercut teeth, a spring thrusting one of said parts towards the other to hold said teeth in mesh, load supporting means associated with said driven member and, when carrying a substantial load, cooperating with said spring to place said teeth under pressure on each other to resist separating movement of said parts, a manually operable piece having a spring connection to said part, the thrust of said spring connection being opposed to the thrust of said spring, said spring connection having a resistance to distortion exceeding the resistance of said first mentioned spring whereby manual movement of said piece may overcome said spring and separate said teeth when said means is not loaded, and stop elements positively limiting distortion of said spring connection so that the same cannot be distorted beyond a point where its resistance exceeds the resistance of said first mentioned spring and the resistance of said undercut teeth when said means is loaded.

FORD PENNELL.